UNITED STATES PATENT OFFICE.

HYLEMAN ALISON WEBSTER, OF COLUMBIA, TENNESSEE, ASSIGNOR TO JOHN J. GRAY, JR., OF ROCKDALE, TENNESSEE.

PROCESS OF PRODUCING FERROPHOSPHORUS IN ROTARY FURNACES.

1,265,149.

Specification of Letters Patent.

Patented May 7, 1918.

No Drawing.

Application filed October 13, 1916. Serial No. 125,409.

*To all whom it may concern:*

Be it known that I, HYLEMAN ALISON WEBSTER, a citizen of the United States, residing at Columbia, in the county of Maury and State of Tennessee, have invented certain new and useful Improvements in Processes of Producing Ferrophosphorus in Rotary Furnaces; and I do hereby declare the following to be a full, clear, and exact description of the invention, such as will enable others skilled in the art to which it appertains to make and use the same.

This invention relates to a process of producing ferro-phosphorus from phosphate rock in a rotary kiln furnace, and has for its object to provide a method which will be efficient in action, continuous in operation, and less costly to carry out than those heretofore proposed.

With these and other objects in view the invention consists in the novel steps and combinations of steps constituting the invention, all as will be more fully hereinafter disclosed and particularly pointed out in the claims.

In the prior U. S. Patent #831427, issued to John J. Gray, Jr., and dated September 18, 1906, entitled Manufacture of ferro-phosphorus there is disclosed a blast furnace process of producing ferro-phosphorus from tri-calcium phosphate, but in such process the ore of necessity has to be of a size suitable for blast furnace practice, and it results among other things that such an intimate contact between the carbon and ore is not had as is the case in a rotary kiln furnace where the ore can be more finely subdivided and the carbon can be more thoroughly mixed therewith. In addition to the above, in a process of producing ferro-phosphorus from phosphate rock, it is very desirable indeed to control the temperature as accurately as possible in the fusion zone so as to more efficiently reduce the phosphorus while in contact with incandescent carbon, and thereby avoid any phosphorus going to waste. The rotary kiln furnace lends itself to this desirable result better than a blast furnace in that the heat can be supplied from an oil blast burner, a blast fed by producer gas or by other well known fuels, and therefore can be controlled to a much more accurate degree than is possible in a blast furnace. In addition, substantially the entire interior of the rotary furnace may be made to serve as a zone of incandescent carbon or a reduction zone for the phosphorus, so that the said phosphorus has practically no chance to escape unreduced, thus producing more favorable conditions for the purpose in hand than is possible in a blast furnace.

The above features are of peculiar importance in the production of high grade ferrophosphorus containing above say 15% or 20% of phosphorus as will now be more fully explained.

In the making of high grade ferro-phosphorus in a blast furnace, it is substantially impossible to get as intimate a mixture of the carbon and rock material as is desired because the operator is limited in the fineness to which the material can be used in the furnace. This results in a less efficient reduction of the phosphorus and also a higher fuel cost than is desired. In the rotary type of furnace, on the other hand, no such objections are met with. And in addition to this, the chemical principles underlying the successful commercial production of high grade ferro-phosphorus peculiarly combine with these advantages as will now more fully appear.

That is to say, it is not generally known that carbon monoxid CO, under the increasing pressures that exist in a blast furnace, will not reduce oxids of phosphorus such as $P_2O_5$ to the elemental state; although under atmospheric pressure it will reduce $P_2O_5$ to lower oxids of phosphorus.

In other words, it is not generally known that in making the above high grade ferrophosphorus in a blast furnace, it is impracticable to utilize the CO present to reduce the phosphorus. On the other hand, no such increasing pressures are met with in a rotary furnace, but only substantially normal pressures, and therefore, I can rely on the CO generated in the rotary furnace to partially reduce the $P_2O_5$ to the elemental state, and can therefore effect a material saving in fuel.

Further, from the above it is evident that in a blast furnace the zone of incandescent carbon must be relied on to reduce the phosphorus to the elemental state; and it is further evident that if any unreduced phosphorus escapes from this zone it is lost to the product. But the extent of this zone is limited in a blast furnace and therefore such limitation requires an abnormal quantity of carbon to be employed in a blast furnace to obtain the required amount of elemental phosphorus. In the rotary furnace, on the other hand, no such limitation of the incandescent zone is met with and should some phosphorus escape unreduced from one part of the furnace, it will pass on only to meet with incandescent carbon and suffer reduction in another portion of the furnace.

Again the finer sub-division of the charge in a rotary furnace and the resulting more intimate contact of the constituents greatly aid in bringing about the desired reactions and a further saving of fuel is attained.

Accordingly, in carrying out this process I provide any suitable rotary kiln furnace and I prepare a suitable charge of phosphate rock such as tri-calcium phosphate and mix therewith a quantity of carbon which when added to the carbon carried by the fuel blast will be in excess of that required to reduce all the combined phosphorus present to an elemental state. I also add a slight excess of silica over that necessary to completely satisfy the calcium oxid and other bases present. I crush the charge thus prepared to a suitable state of fine sub-division say to a quarter inch mesh or even finer, and I continuously charge this mixture into the rotating furnace.

Omitting the air and not counting the carbon introduced by the blast, the following may be considered as an example of the proportions of a charge that would be suitable in carrying out this process:—

| | Lbs. |
|---|---|
| Tri-calcium phosphate, $Ca_3P_2O_8$ | 1050 |
| Calcium fluorid, $CaFl_2$ <br> Calcium carbonate, $CaCO_3$ <br> Calcium sulfate, $CaSO_4$ | 224 |
| Silica, $SiO_2$ | 63 |
| Iron ore $Fe_2O_3$ | 63 |
| Total phosphate rock | 1400 |
| $Fe_2O_3$ | 700 |
| $SiO_2$ | 252 |
| $Al_2O_3$, plus $H_2O$ | 448 |
| Total iron ore | 1400 |
| Silica, sand or flint: | |
| $SiO_2$ | 576 |
| $K_2O$ | 64 |
| Total | 640 |
| Coke as carbon, C | 1000 |
| | 4440 |

The amount of air required in any given case will depend upon the quantity of materials charged, upon the speed of rotation of the furnace and upon the temperature maintained inside the furnace. The exact proportions will be determined by the furnace man, when it is desired to reach a maximum capacity as follows:

Suppose the fuel blast is so set as to maintain a given temperature of say 1200° C. on the inside of the furnace, the operator will pass in the above mixture at a predetermined speed and admit a given blast of air into the furnace whereupon he will rotate the furnace at different speeds and watch the materials at the furnace exit until they show a satisfactory reaction between the constituents of the charge. When this condition has been attained the furnace will probably not be operating at its maximum capacity and the furnace man will next increase the speed of feed of the material and at the same time increase the air blast, keeping the speed of rotation and the fuel blast constant and when the proper reaction has again been reached the speed of rotation is again increased as well as the quantity of charge material and so on, until the maximum capacity of the furnace is attained.

The heat may be conveniently supplied to the furnace as above stated by any suitable blast and as it is under absolute control the temperature inside the furnace is governed to such a nicety that a uniform product is easily produced under highly efficient conditions.

The reduced iron is obtained in a relatively fine state of sub-division, it readily takes up the liberated phosphorus, and a high grade of ferro-phosphorus in the form of nodules results at once. The slag, on the other hand, separates to a greater or less extent from the ferro-phosphorus thus formed, and the whole mass passes out the exit end of the furnace where it may be received in water and the slag granulated.

After the slag has been thus sub-divided the mass of granular slag and nodular ferro-phosphorus is passed through any suitable magnetic or other separator and the ferro-phosphorus recovered.

In this process the acids and bases are carefully balanced using say $1\frac{1}{6}$ parts silica $SiO_2$ to each part of calcium oxid CaO, or magnesium oxid MgO, when the latter is present. In using such an excess of silica in the charge when proper temperatures are reached, say 1100° C., to 1600° C., the $SiO_2$ attacks the tri-calcium phosphate of the charge, combines with the calcium oxid, or magnesium oxid if present, to form calcium silicate $CaSiO_3$, or magnesium silicate $MgSiO_3$, and liberates phosphorus pentoxid $P_2O_5$, while the incandescent carbon present immediately deoxidizes the $P_2O_5$ to elemental phosphorus $P_2$.

It is obvious that those skilled in the art may vary the details of the process without departing from the spirit of the invention, and therefore, I do not wish to be limited to the above disclosure except as may be required by the claims.

What I claim is:—

1. The process of producing ferro-phosphorus in a rotary furnace containing above 10% phosphorus from phosphate rock which consists in charging into said furnace a suitable mixture of sub-divided phosphate rock, silica in excess and carbon; subjecting said mixture to the action of air and to a temperature above 1000° C. and below 1750° C., revolving the furnace in order to bring about an intimate contact of its constituents; maintaining incandescent carbon throughout the charge collecting the ferro-phosphorus and slag thus produced; and suitably recovering said ferro-phosphorus, substantially as described.

2. The process of producing ferro-phosphorus in a rotary furnace containing above 10% phosphorus from phosphate rock which consists in charging into said furnace a suitable mixture of sub-divided phosphate rock, silica in excess and carbon; said carbon being in excess of that required to reduce the phosphorus present to an elemental state; subjecting said mixture to the action of air and to a temperature above 1000° C. and below 1750° C.; continuously maintaining incandescent carbon throughout the charge while revolving the furnace in order to bring about an intimate contact of its constituents; collecting the ferro-phosphorus and slag thus produced; and suitably recovering said ferro-phosphorus, substantially as described.

3. The process of producing ferro-phosphorus in a rotary furnace containing above 10% phosphorus from phosphate rock which consists in charging into said furnace a suitable mixture of sub-divided phosphate rock, silica, and carbon; said carbon being in excess of that required to reduce the phosphorus present to the elemental state and said silica being in excess of that necessary to satisfy the bases present; subjecting said mixture to the action of air and to a temperature above 1000° C., maintaining incandescent carbon throughout the charge while revolving the same in order to bring about an intimate contact of its constituents; collecting said ferro-phosphorus and slag thus produced; and suitably recovering said ferro-phosphorus, substantially as described.

In testimony whereof I affix my signature in presence of a witness.

HYLEMAN ALISON WEBSTER.

Witness:
T. A. WITHERSPOON.